(12) United States Patent
Wentz

(10) Patent No.: US 12,646,110 B2
(45) Date of Patent: Jun. 2, 2026

(54) ELECTRONIC TRANSACTION AUTOMATED CONTROL TOTAL REEVALUATION ACROSS MULTIPLE CHANNELS

(71) Applicant: Truist Bank, Charlotte, NC (US)

(72) Inventor: Douglas W. Wentz, Manheim, PA (US)

(73) Assignee: Truist Bank, Charlotte, NC (US)

( * ) Notice: Subject to any disclaimer, the term of this patent is extended or adjusted under 35 U.S.C. 154(b) by 107 days.

(21) Appl. No.: 18/497,580

(22) Filed: Oct. 30, 2023

(65) Prior Publication Data

US 2025/0139596 A1 May 1, 2025

Related U.S. Application Data

(63) Continuation of application No. 18/497,346, filed on Oct. 30, 2023.

(51) Int. Cl.
| | |
|---|---|
| *G06Q 20/40* | (2012.01) |
| *G06Q 20/02* | (2012.01) |
| *G06Q 20/10* | (2012.01) |
| *G06Q 40/02* | (2023.01) |

(52) U.S. Cl.
CPC ....... *G06Q 40/0225* (2025.08); *G06Q 20/023* (2013.01); *G06Q 20/108* (2013.01); *G06Q 20/401* (2013.01)

(58) Field of Classification Search
CPC ........................... G06Q 20/401; G06Q 20/023
USPC ........................................................ 705/39
See application file for complete search history.

(56) References Cited

U.S. PATENT DOCUMENTS

| | | | |
|---|---|---|---|
| 2009/0287529 A1* | 11/2009 | Johnson ................. | G06Q 40/00 705/35 |
| 2011/0251952 A1* | 10/2011 | Kelly ................... | G06Q 20/102 705/40 |
| 2014/0372309 A1* | 12/2014 | Shirey ................... | G06Q 40/06 705/44 |
| 2022/0309500 A1* | 9/2022 | Arunachalam ..... | G06F 16/2282 |

* cited by examiner

*Primary Examiner* — Lindsay M Maguire
(74) *Attorney, Agent, or Firm* — Kilpatrick Townsend & Stockton LLP; Michael A. Springs, Esq.

(57) ABSTRACT

A system for automatic control total reevaluation during batch processing of ACH data files, such that control total information received by an originating financial institution after an attempted batch processing operation on an associated ACH data file can still be automatically matched with the already received associated ACH data file, the ACH data file can be appropriately modified to reflect receipt of the matching control total information, and the ACH data file can be processed at a subsequent scheduled batch processing operation.

20 Claims, 5 Drawing Sheets

ECWEXCP Layout

```
-EDIT ECWEXCP    C         C    EXCEPTION MESSAGE TABLE WORK AREA     ECWEXCP
000100*                                                             -*ECWEXCP
000200*                                                              *ECWEXCP
000300*                D B   LV   D A T A   E X C P                  *ECWEXCP
000400*                                                              *ECWEXCP
000500* PURPOSE:                                                     *ECWEXCP
000600*                                                              *ECWEXCP
000700* WORK AREA FOR THE PROCESSING EXCEPTIONS TABLE                *ECWEXCP
000800*                                                              *ECWEXCP
000900*                                                             -*ECWEXCP
001000*                                                              ECWEXCP
001100    12  WEXCP-EXCP-SEGMENT-DEF.                                ECWEXCP
001200    16  WEXCP-EXCP-TBL-KEY         PIC 9(011).                 ECWEXCP
001300    16  WEXCP-EXCP-FILE-NO         PIC 9(011).                 ECWEXCP
001400    16  WEXCP-EXCP-BATCH-NO        PIC 9(007).                 ECWEXCP
001500    16  WEXCP-EXCP-POINT           PIC X(009).                 ECWEXCP
001600    16  WEXCP-EXCP-APPL            PIC X(009).                 ECWEXCP
001700    16  WEXCP-EXCP-TYPE            PIC X(006).                 ECWEXCP
001800    16  WEXCP-EXCP-DATE            PIC 9(008).                 ECWEXCP
001900    16  WEXCP-EXCP-WINDOW          PIC S9(004)  COMP.          ECWEXCP
002000    16  WEXCP-EXCP-CR-AMT          PIC S9(011)V9(2) COMP-3.    ECWEXCP
002100    16  WEXCP-EXCP-DR-AMT          PIC S9(011)V9(2) COMP-3.    ECWEXCP
002200    16  WEXCP-EXCP-ERR-CD          PIC X(008).                 ECWEXCP
002300    16  WEXCP-EXCP-ERR-ACTION      PIC X(001).                 ECWEXCP
002400    16  WEXCP-EXCP-ERR-CATEGORY    PIC X(002).                 ECWEXCP
002500    16  WEXCP-EXCP-ERR-MSG         PIC X(120).                 ECWEXCP
002600*                                                              ECWEXCP
```

FIG. 4

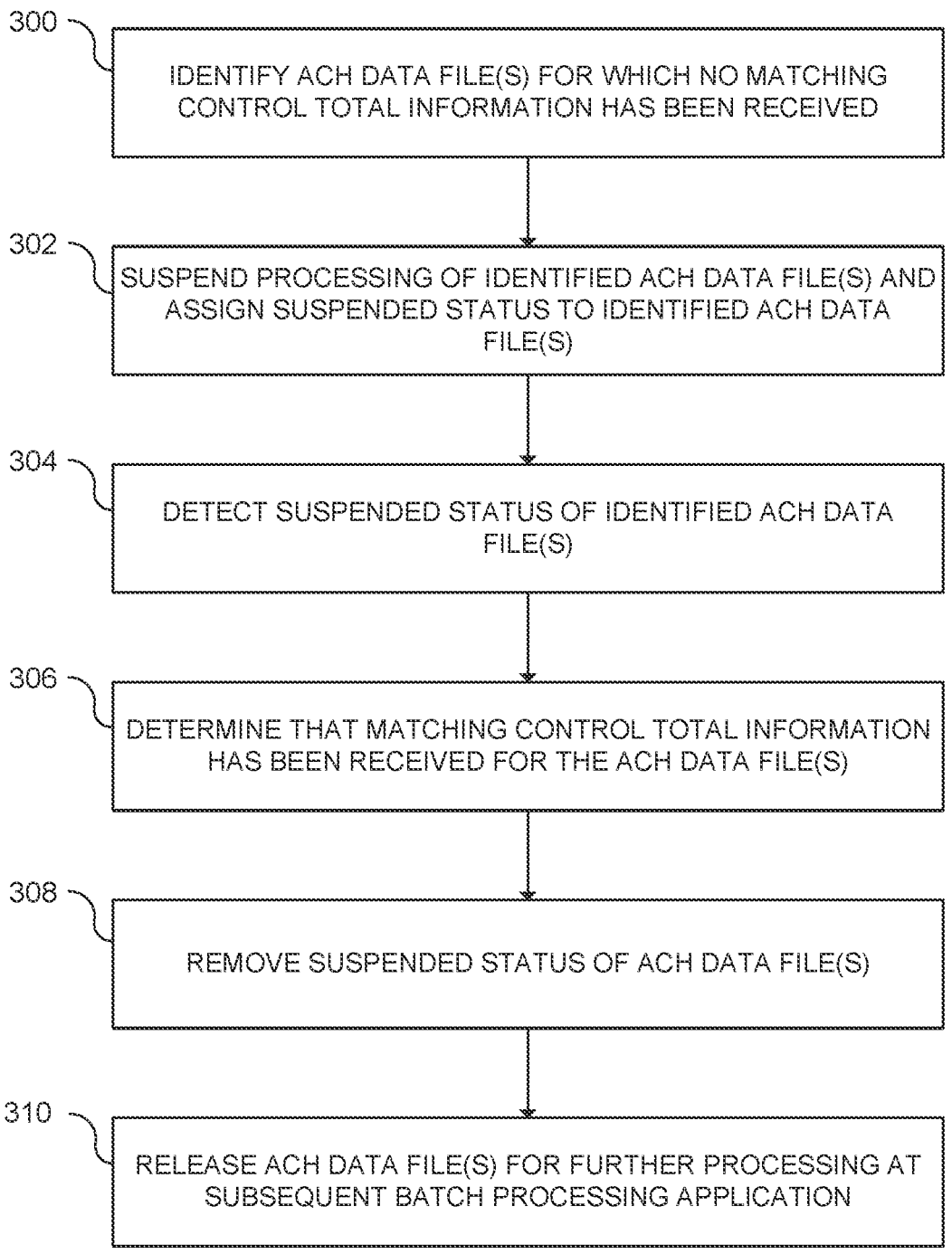

300 — IDENTIFY ACH DATA FILE(S) FOR WHICH NO MATCHING CONTROL TOTAL INFORMATION HAS BEEN RECEIVED

302 — SUSPEND PROCESSING OF IDENTIFIED ACH DATA FILE(S) AND ASSIGN SUSPENDED STATUS TO IDENTIFIED ACH DATA FILE(S)

304 — DETECT SUSPENDED STATUS OF IDENTIFIED ACH DATA FILE(S)

306 — DETERMINE THAT MATCHING CONTROL TOTAL INFORMATION HAS BEEN RECEIVED FOR THE ACH DATA FILE(S)

308 — REMOVE SUSPENDED STATUS OF ACH DATA FILE(S)

310 — RELEASE ACH DATA FILE(S) FOR FURTHER PROCESSING AT SUBSEQUENT BATCH PROCESSING APPLICATION

ELECTRONIC TRANSACTION AUTOMATED CONTROL TOTAL REEVALUATION ACROSS MULTIPLE CHANNELS

CROSS-REFERENCE TO RELATED APPLICATIONS

This application is a continuation of U.S. patent application Ser. No. 18/497,346 filed on Oct. 30, 2023, and titled "Electronic Transaction Automated Control Total Reevaluation Across Multiple Channels," the disclosure of which are hereby incorporated by reference in its entirety.

TECHNICAL FIELD

The present disclosure relates generally to electronic transaction systems, and more particularly, although not exclusively, to an intermediary system for reevaluating suspended ACH data files.

BACKGROUND

An electronic Automated Clearing House (ACH) transaction is typically made by an originator (e.g., a business entity) to an originating financial institution (e.g., a business bank), whereafter the transaction request is processed by the originating financial institution and forwarded through an ACH operator to a receiving financial institution (e.g., a customer bank) for further processing that results in a direct deposit to or a direct payment from the intended recipient of the ACH transaction. ACH transactions comprise data files containing transaction information. A single data file typically includes multiple ACH transaction requests and provides various information about the transaction requests. ACH data files are typically transmitted by originating financial institutions, forwarded by an ACH operator, and processed by receiving financial institutions, in batches and at regular intervals.

The originator of an ACH transaction also normally transmits control total information to the originating financial institution, where the control total is the total transaction amount for a given data file and serves as a verification mechanism. To help prevent fraud, control totals are normally transmitted by an originator to an originating financial institution via a communication channel that is different than the communication channel over which the originator transmits ACH transaction requests to the originating financial institution.

If an originator of an ACH transaction request fails to provide a control total for a given ACH data file prior to attempted processing of the ACH data file by the originating financial institution, the ACH data file and all the ACH transaction requests in the ACH data file, may be suspended, which can be problematic for both the originator and an intended receiving party or parties of the ACH transaction requests associated with the ACH data file. A manual review of an ACH data file may be performed at an originating financial institution in some cases, but given the volume of ACH transactions transmitted and processed on a daily basis, this alternative is inefficient, and can consume significant user, processor, and memory resources.

SUMMARY

According to one example of the present disclosure, a system may include a processor, and memory that is communicatively coupled to the processor and includes instructions that are executable by the processor to cause the processor to perform operations. The operations may include identifying at least one ACH data file of a plurality of received ACH data files as having no matching control total information. The operations may also include suspending processing of the at least one ACH data file and assigning a suspended status to the at least one ACH data file. The operations can additionally include detecting the suspended status of the at least one ACH data file. The operations may further include, based on the suspended status of the at least one ACH data file, comparing the at least one ACH data file to new control total information received subsequent to identifying the at least one ACH data file as having no matching control total information, and resultantly determining that matching control total information has been received for the at least one ACH data file. The operations can still further include, in response to determining that matching control total information has been received for the at least one ACH data file, removing the suspended status of the at least one ACH data file and releasing the at least one ACH data file for further processing at a subsequent scheduled ACH data file batch processing operation.

According to another example of the present disclosure, a non-transitory computer readable medium may contain instructions that are executable by a processor for causing the processor to perform operations. The operations may include identifying at least one ACH data file of a plurality of received ACH data files as having no matching control total information. The operations may also include suspending processing of the at least one ACH data file and assigning a suspended status to the at least one ACH data file. The operations can additionally include detecting the suspended status of the at least one ACH data file. The operations may further include, based on the suspended status of the at least one ACH data file, comparing the at least one ACH data file to new control total information received subsequent to identifying the at least one ACH data file as having no matching control total information, and resultantly determining that matching control total information has been received for the at least one ACH data file. The operations can still further include, in response to determining that matching control total information has been received for the at least one ACH data file, removing the suspended status of the at least one ACH data file and releasing the at least one ACH data file for further processing at a subsequent scheduled ACH data file batch processing operation.

According to a further example of the present disclosure, a computer-implemented method may include identifying at least one ACH data file of a plurality of received ACH data files as having no matching control total information. The method may also include suspending processing of the at least one ACH data file and assigning a suspended status to the at least one ACH data file. The method can additionally include detecting the suspended status of the at least one ACH data file. The method may further include, based on the suspended status of the at least one ACH data file, comparing the at least one ACH data file to new control total information received subsequent to identifying the at least one ACH data file as having no matching control total information, and resultantly determining that matching control total information has been received for the at least one ACH data file. The method can still further include, in response to determining that matching control total information has been received for the at least one ACH data file, removing the suspended status of the at least one ACH data file and releasing the at least one ACH data file for further processing at a subsequent scheduled ACH data file batch processing operation.

BRIEF DESCRIPTION OF THE DRAWINGS

FIG. 4 depicts a data-populated exception table, according to an example of the present disclosure.

FIG. 5 is a flowchart representing a computerized method by which ACH transaction control total reevaluation can be accomplished, according to one example of the present disclosure.

DETAILED DESCRIPTION

Figure 1:
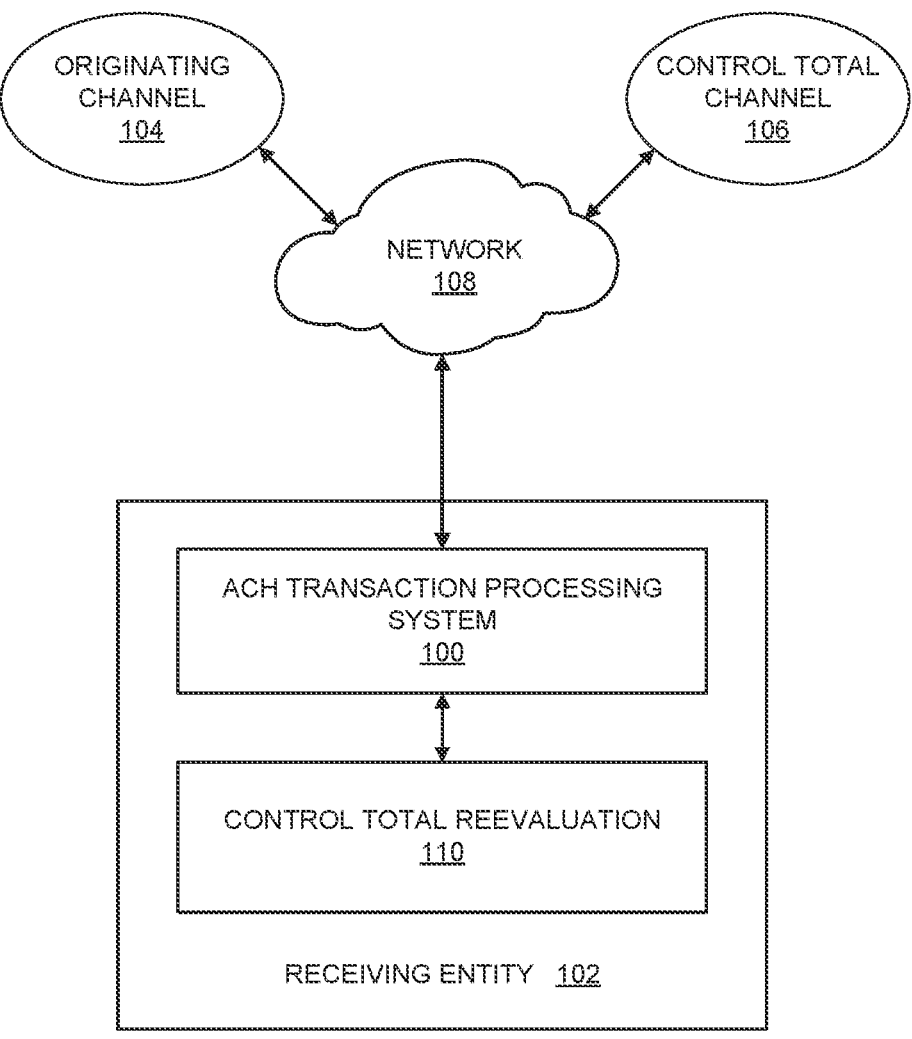
FIG. 1 is a schematic diagram representing of a computing environment within which ACH transaction control total reevaluation can be accomplished, according to an example of the present disclosure.

A computing environment within which ACH transaction control total reevaluation can be accomplished may include an ACH transaction processing system that receives ACH transaction processing requests as data files submitted through originating channels, and control total information submitted through other channels that are different than the originating channels. Processing of ACH transactions by an originating financial institution normally occurs in batches and at regularly schedule intervals. Because the control data information is sent by an originator to the originating financial institution separately from the ACH data files carrying the ACH transaction request information, it sometimes occurs that control total information for a corresponding ACH data file is not received by the originating financial institution at the same time as the ACH data file, or prior to attempted processing of the ACH data file.

Current ACH transaction processing systems of an originating financial institution attempt to match received ACH data files with received control total information at only two stages—during an initial automated schedule and arrival processing (ASAP) stage, and again at the point of a first scheduled batch processing operation. If a given ACH data file remains unmatched with control total information at the time of the first scheduled batch processing operation, the given ACH data file may be rejected, which can cause problems for one or both of the originator and the intended recipient(s) of ACH transactions associated with the ACH data file. Alternatively, the originating financial institution may elect to temporarily hold an ACH data file that remains unmatched with control total information at the time of the first scheduled batch processing operation, and may attempt to match the data file to subsequently received new control total information to determine if any of the new control total information can be matched to the unmatched ACH data file. If so, the given ACH data file can be manually reset and subsequently processed. However, the given ACH data file cannot be held indefinitely, and even if the given ACH data file can be eventually matched with newly received control total information, the resulting processing delay can cause problems for one or both the originator and the intended recipient(s) of the corresponding ACH transactions. Furthermore, the ACH data file holding process, manual review process, manual file reset process, associated communications, etc., is inefficient and wastes user, processor, and memory resources.

Aspects of the present disclosure are directed to a system for automatic control total reevaluation during processing of ACH transactions (ACH data files), such that control total information that is not timely received by an originating financial institution can still be automatically matched with an already received corresponding ACH data file, the ACH data file can be appropriately modified to reflect receipt of the matching control total information, and the ACH data file can be processed at a subsequent (e.g., next scheduled) batch processing operation. A system for automatic control total reevaluation according to examples of the present disclosure may obviate the need to reject ACH data files due to untimely submitted control total information, and can also save the time, and processor and memory resources, required to perform, or repeatedly perform, a manual review and matching operation on subsequently received control total information.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

FIG. 1 is a schematic diagram representing an example of a computing environment including an ACH transaction processing system 100 associated with an originating financial institution 102 to which originators can submit ACH transaction processing requests. The ACH transaction processing system 100 can receive ACH data files from an originator (e.g., a business entity) via a first, originating channel 104, and can receive control total information from the originator via a second, control total channel 106, that is different than the originating channel 104. Although only one originating channel 104 and one control total channel 106 are shown in FIG. 1 for purposes of illustration, a different number of initiating channels may be present in other examples. For example, the ACH transaction processing system 100 can receive ACH data files from different originators via multiple originating channels and can receive control total information from those originators via multiple control total channels, but the control total channels are different than the originating channels for purposes of preventing fraud and otherwise.

The originating channel 104 can transmit ACH data files and the control total channel 106 can transmit control total information to the ACH transaction processing system 100 via a network 108. The network 108 may be without limitation, a local area network (LAN), a wide-area network (WAN) such as the Internet, an institutional network, cellular or other wireless networks, virtual networks such as an intranet or an extranet, etc.

A control total reevaluation module 110 may be communicatively coupled to or may be a part of the ACH transaction processing system 100. The control total reevaluation module 110 is operative to perform an automatic control total reevaluation operation relative to ACH data files for which matching control total information has not been received at the originating financial institution by the time of a first attempted processing of the ACH data files. Examples of the control total reevaluation module 110 can allow control total information that is not timely sent by an originator or not timely received by an originating financial institution to nonetheless be automatically matched with an already received corresponding ACH data file, and for the ACH data file to be processed instead of being rejected.

Figure 2:
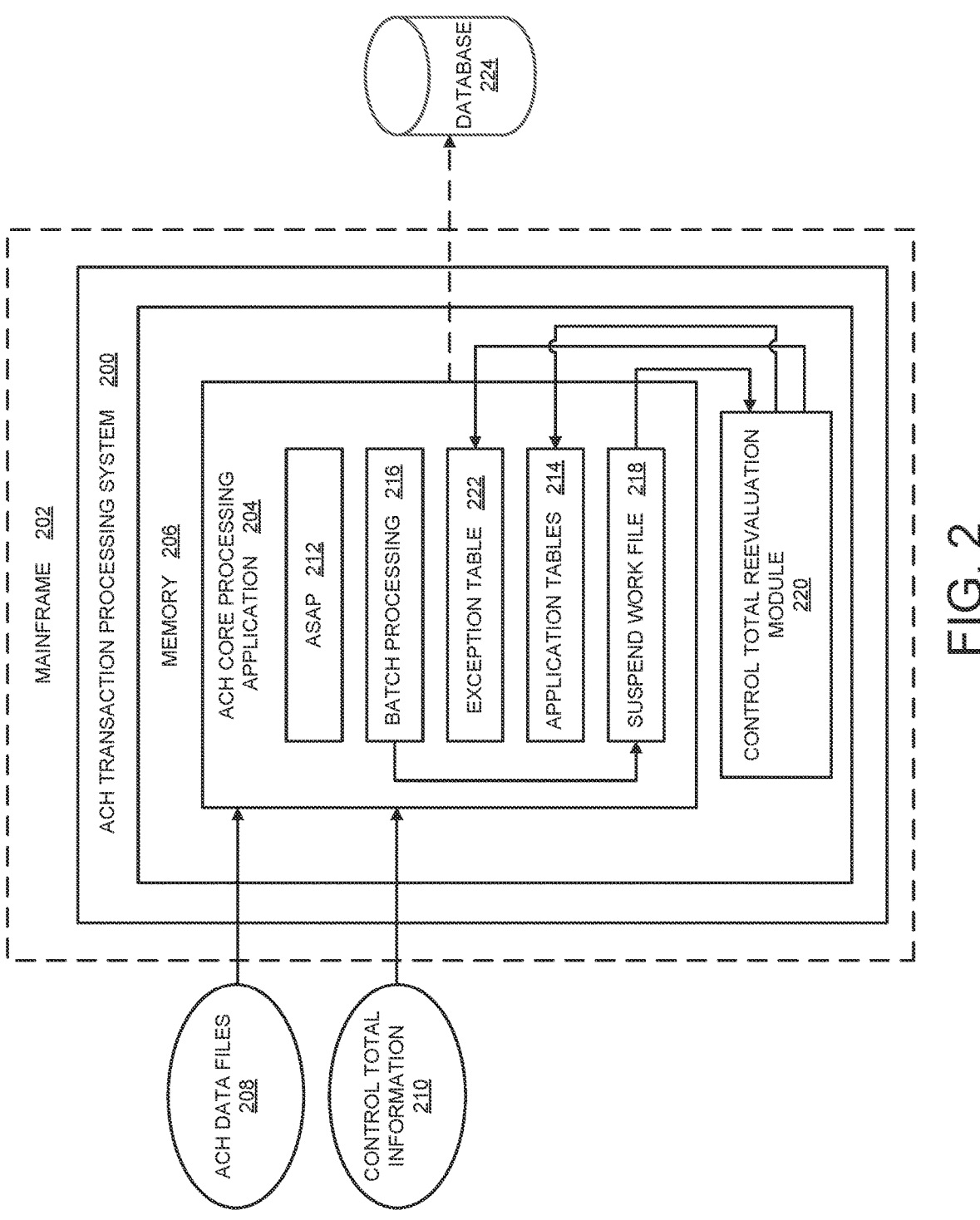
FIG. 2 is a block diagram of a system for accomplishing ACH transaction control total reevaluation, according to an example of the present disclosure.

FIG. 2 is a more detailed block diagram of an ACH transaction processing system 200 with control total reevaluation functionality, according to an example of the present disclosure. As shown, this example of the ACH transaction processing system 200 executes on a mainframe 202 of an originating financial institution.

The ACH transaction processing system 200 can include an ACH core processing application 204 that resides in a memory 206 of the ACH transaction processing system 200. The ACH core processing application 204 can receive a plurality of ACH data files 208, which can include identifying information about the ACH transaction originator and the intended ACH transaction recipient, routing numbers, account numbers, credit or debit transaction amounts, etc. The ACH core processing application 204 can also receive control total information 210 associated with the plurality of ACH data files 208. As indicated in FIG. 1 and described above, the plurality of ACH data files 208 and the control total information 210 are transmitted by the originator to the originating financial institution via different channels.

The ACH core processing application 204 may include an automated schedule and arrival processing (ASAP) component 212. The ASAP component 212 may perform various functions. For example, the ASAP component 212 can schedule, or assist with scheduling, the received plurality of ACH data files 208 for future batch processing by the ACH core processing application 204. The ASAP component 212 may also function to match the received plurality of ACH data files 208 with received control total information 210. As explained above, the ASAP component 212 is one of only two points during processing of the ACH data files 208 by the originating financial institution where matching of received ACH data files with received control total information is normally attempted. Information associated with the plurality of ACH data files 208 as well as control total information 210 may be stored, for example, in one or more application tables 214 of the ACH core processing application 204.

The plurality of ACH data files 208 received by the originating financial institution are processed in batches, such as by a batch processing component 216 of the ACH core processing application 204. Batch processing of ACH data files by the originating financial institution normally occurs at regularly scheduled intervals, such as at multiple times throughout a given day. At the time of a first scheduled ACH data file batch processing operation relative to the received plurality of ACH data files 208, the ACH core processing application 204 will normally make its last attempt to match the plurality of ACH data files 208 with the control total information 210 received by the originating financial institution.

As part of the attempted matching operation at the first scheduled ACH data file batch processing operation, the ACH core processing application 204 can also identify an ACH data file of the plurality of ACH data files 208 received by the ACH core processing application 204 for which no matching control total information has been received. If the ACH core processing application 204 identifies at least one ACH data file for which no matching control total information has been received, the ACH core processing application 204 can suspend processing of the at least one ACH data file. Additionally, the ACH core processing application 204 may also write a processing suspension message associated with the at least one ACH data file to a suspend work file 218, which is a file via which suspended ACH data files can be identified and tracked.

Traditionally, once an ACH data file is suspended by the ACH core processing application 204 based on a lack of matching control total information, the file will be rejected absent subsequently matching the suspended ACH data file with later-received control total information 210 by way of the above-described and undesirable manual control total information review and ACH data file resetting process. In order to avoid possible unnecessary rejection of ACH data files without the need to perform a time and resource consuming manual review and file resetting process, the ACH transaction processing system 200 according to examples of the present disclosure can employ a control total reevaluation module 220. The control total reevaluation module 220 can perform a control total reevaluation process relative to ones of the plurality of ACH data files 208 that could not be matched to received control total information 210 at the time of a scheduled batch processing operation.

A processor associated with the control total reevaluation module 220 can create an exception table 222 within the ACH core processing application 204. The exception table 222 can serve as a temporary storage location for information relating to ACH data files that have been suspended by the ACH core processing application 204 because no matching control total information was received as of the time of the first scheduled ACH data file batch processing operation. In this regard, the control total reevaluation module 220 may copy processing suspension messages from the suspend work file 218 to the exception table 222, or may extract certain information contained in the processing suspension messages of the suspend work file 218 and store the extracted information as processing suspension message entries in the exception table 222.

The control total reevaluation module 220 attempts to automatically match the ACH data files of the plurality of ACH data files 208 for which no matching control total information 210 was found as of the time of the first scheduled batch processing operation, with new control total information received after the first scheduled batch processing operation but prior to one or more subsequent (e.g., a second) scheduled ACH data file batch processing operations. To this end, the control total reevaluation module 220 can read processing suspension message entries in the exception table 222 and resultantly compare ACH data files associated with the processing suspension message entries to the new control total information.

From the comparison of the new control total information with the unmatched ACH data files associated with the processing suspension message entries, it can be determined by the control total reevaluation module 220 whether any of the new control total information matches the ACH data files. In response to determining that matching control total information has been received for at least one of the ACH data files associated with the processing suspension message entries, the processing suspension message entry associated with the at least one of the ACH data files can be deleted from the exception table 222.

In response to determining that matching control total information has been received for at least one of the ACH data files associated with the processing suspension message entries, the control total reevaluation module 220 can also modify the at least one ACH data file to indicate the at least one ACH data file has been matched with received control total information. For example, the at least one ACH data file can be modified by removing the suspended status of the at least one ACH data file, which indicates that the at least one ACH data file is thereafter available for processing by the ACH core processing application 204. According to one particular example, the at least one ACH data file can be modified by amending a collected file segment of the at least one ACH data file to indicate that the at least one ACH data file is no longer suspended.

As a result of removing the suspended status of the ACH data file, and rendering the ACH data file thereafter available for processing, it may be necessary to calculate and assign a new distribution and settlement date for one or more batches within the ACH data file. Therefore, according to one example, the control total reevaluation module 220 can also calculate and assign new distribution and settlement dates for any batches within the ACH data file that require such an operation. After removing the suspended status of an ACH data file and assigning any required new distribution and settlement dates, the processor associated with the control total reevaluation module 220 can subsequently cause the at least one ACH data file to be further processed by the ACH core processing application 204, thereby avoiding rejection of the at least one ACH data file or an undesirable manual control total information review and ACH data file resetting process.

The process of attempted matching by the control total reevaluation module 220 of previously received ACH data files having no initially matching control total information with newly received control total information may continue, for example, until some predetermined number of ACH data file batch processing operations have been completed, or until a predetermined amount of time has passed. For example, the control total reevaluation module 220 may stop reading the processing suspension message entries in the exception table after some predetermined number of ACH data file batch processing operations have been completed or after a predetermined amount of time has passed. Any previously received ACH data files having no initially matching control total information that have not been matched with newly received control total information at the point where the processor stops reading the processing suspension message entries in the exception table, can be labeled as permanently suspended or may simply be rejected.

Depending on the number of batch processing operations over which reevaluation will be attempted or the amount of time during which reevaluation will be attempted, there may be an accrual of received ACH data files that cannot be currently matched to received control total information. For example, additional unmatched ACH data files may be received between a first and second scheduled batch processing operation, a second and third scheduled batch processing operation, etc. When such additional ACH data files are discovered, corresponding suspension messages are written to the suspended work file for those ACH data files.

Consequently, prior to a second scheduled ACH data file batch processing operation, the control total reevaluation module 220 may read every processing suspension message entry in the exception table and resultantly compare ACH data files associated with the processing suspension message entries to the new control total information. The control total reevaluation module 220 may then determine, in response to comparing the ACH data files with the new control total information, that matching control total information has been received for at least some of the ACH data files, and in response to determining that matching control total information has been received for at least some of the ACH data files, the control total reevaluation module 220 may delete from the exception table the processing suspension message entries associated with the ACH data files for which matching control total information has been received. The control total reevaluation module 220 can then modify the ACH data files for which matching control total information has been received by amending each of the ACH data files to remove the suspended status thereof, and the processor associated with the control total reevaluation module 220 may subsequently cause each of the ACH data files to be further processed by the ACH core processing application.

It is possible that additional batch processing operations may also be scheduled, and there may still be unmatched ACH data files and associated suspension messages remaining after multiple batch processing attempts or an additional accrual of received ACH data files that cannot be currently matched to received control total information may have occurred. Consequently, prior to a third and each of some predetermined number of additional scheduled ACH data file batch processing operations, the control total reevaluation module 220 may read all remaining processing suspension message entries in the exception table and resultantly compare ACH data files associated with the remaining processing suspension message entries to new control total information received after an immediately preceding ACH data file batch processing operation. The control total reevaluation module 220 can then determine, in response to comparing the ACH data files associated with the remaining processing suspension message entries with the new control information, that matching control total information has been received for at least some of the ACH data files associated with the remaining processing suspension message entries.

Because received control total information, received ACH data file information, or both, may be stored (e.g., written to the application tables 214 of the ACH core processing application 204), the stored information can consume significant memory resources in just a short time if not deleted. As such, the control total reevaluation module 220 can operate to purge all matching control total information received by the receiving entity upon expiration of a predetermined time period or based on some other trigger.

The control total reevaluation module 220 may also, upon identification of an ACH data file for which no matching control total information has been received, generate a notification. The notification may be presented on a display, may be an electronic message that is transmitted to one or more receiving parties such as an ACH transaction request originator or intended recipient, etc. The notification may at least identify the ACH data file for which no matching control total information has been received.

The ACH transaction processing system 200 may also be communicatively coupled to a database 224, and may write data to and read date from the database 224. For example, the ACH transaction processing system 200 may archive data to the database 224. In another example, the exception table 222, application tables 214, suspend work file 218, or any combination thereof, may be stored in the database 224 instead of in the memory 206 of the ACH transaction processing system 200, or backup copies thereof may be stored in the database 224.

It should also be understood that a received ACH data file may be suspended by the ACH transaction processing system 200 for a number of reasons other than a lack of matching control total information. Consequently, an example of the control total reevaluation module 220 according to the present disclosure may ignore any ACH data files that have been suspended for a reason other than a lack of matching control total information, or any ACH data files that have been suspended for other reasons in addition to a lack of matching control total information. This can ensure that the control total reevaluation module 220 does not inadvertently reset the suspended status of an ACH data file that should remain suspended for one or more reasons even after the ACH data file is eventually matched with received control total information.

As described above, an originating financial institution may receive a substantial amount of ACH data files and control total information on a regular basis. As such, the control total reevaluation module 220 according to an example of the present disclosure may, but is not required to, render the process of attempted ACH data file-to-control total information matching more efficient by only comparing a given unmatched ACH data file to control total information received from the same originator as the unmatched ACH data file. In other words, when attempting to match a given unmatched ACH data file to newly received control total information, the control total reevaluation module 220 may first filter the new control total information to include only control information received from the originator of the unmatched data file. This eliminates the need for the control total reevaluation module 220 to compare a given unmatched ACH data file to all newly-received control total information, which may be substantial in volume and can include control information from one or more other originators.

Figure 3:
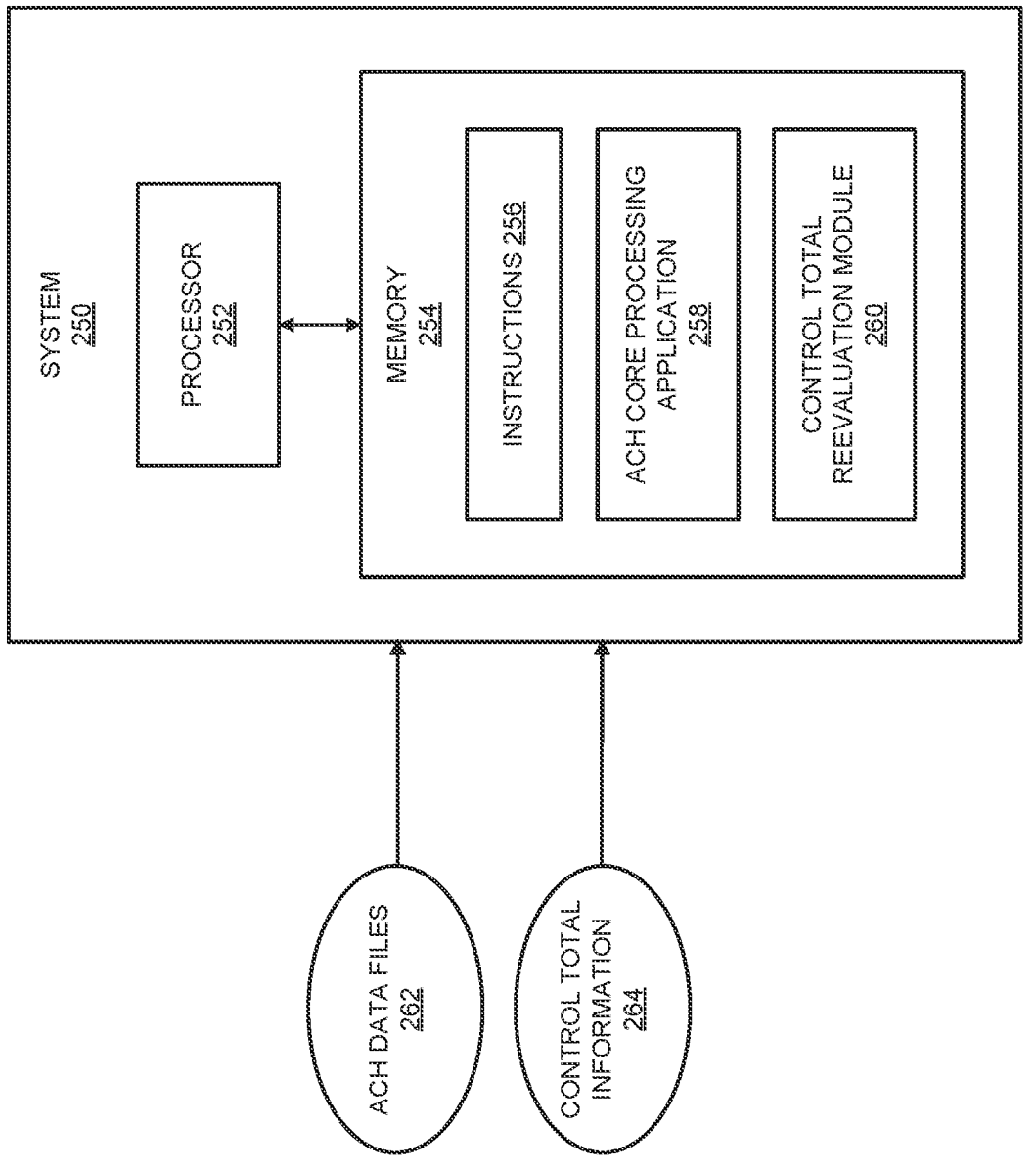
FIG. 3 is block diagram of a computing device of a system for accomplishing ACH transaction control total reevaluation, according to an example of the present disclosure.

FIG. 3 is more detailed block diagram of an ACH transaction processing system 250 according to an example of the present disclosure, which may be the same as or similar to the ACH transaction processing system 200 described above with respect to the diagram of FIG. 2. As shown, the ACH transaction processing system 250 may include a processor 252 that is communicatively coupled to a memory 254. The processor 252 can include one processing device or multiple processing devices. Non-limiting examples of the processor 252 include a Field-Programmable Gate Array (FPGA), an application-specific integrated circuit (ASIC), a microprocessor, etc. The processor 252 can execute instructions 256 stored in the memory 254 to perform operations. In some examples, the instructions 256 can include processor-specific instructions generated by a compiler or an interpreter from code written in a suitable computer-programming language, such as C, C++, C#, etc.

The memory 254 can include one memory or multiple memories. The memory 254 can be non-volatile and may include any type of memory that retains stored information when powered off. Non-limiting examples of the memory 254 include electrically erasable and programmable read-only memory (EEPROM), flash memory, or any other type of non-volatile memory. At least some of the memory 254 can be a non-transitory computer-readable medium from which the processor 252 can read the instructions 256. A computer-readable medium can include electronic, optical, magnetic, or other storage devices capable of providing the processor 252 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 252 can read the instructions 256.

The memory 254 may also include an ACH core processing application 258 and a control total reevaluation module 260. Each of the ACH core processing application 258 and a control total reevaluation module 260 can function as previously described with respect to the example of FIG. 2 to analyze and operate on received ACH data files 262 and control total information 264.

FIG. 4 represents one example of an exception table to which has been stored various information extracted from a processing suspension message associated with an ACH data file that was suspended due to a lack of matching control total information. In the particular example of FIG. 4, the exception table includes processing suspension message entries that describe (in order of appearance in the table): a unique identifying reference for the entry residing in the exception table; a unique file number assigned to the file when collected by the ACH core processing application; a sequential number of the specific batch within the file; a primary identifier for the file originator; a secondary identifier for the file originator; a tertiary identifier for the file originator; a processing date of file collection; a processing cycle of file collection; a total credit amount of the file; a total debit amount of the file; an alpha-numeric identifier of the specific suspension reason; a resulting action from the suspension reason; a suspension reason classification; and a text description of the suspension reason. Other exception table examples according to the present disclosure may include a different collection of processing suspension message entries.

FIG. 5 is a flowchart illustrating a computer-implemented method for automated ACH transaction control total reevaluation, according to one example of the present disclosure. As represented at block 300, a processor can identify at least one ACH data file of a plurality of ACH data files received by the receiving entity for which no matching control total information has been received. In some examples, the processor may identify the at least one ACH data file using a control total reevaluation module, which may also generate an exception table within an ACH core processing application of a receiving entity. At block 302, processing of the at least one ACH data file can be suspended by the processor. Additionally, a suspended status can be assigned to the at least one ACH data file by the processor to indicate that processing cannot proceed because no matching control total information has been received for the at least one ACH data file. At block 304, the suspended status of the at least one ACH data file can be later detected by the processor. Based on the suspended status of the at least one ACH data file, the processor can, at block 306, determine that matching control total information has been received for the at least one ACH data file by comparing the at least one ACH data file to new control total information received subsequent to identifying the at least one ACH data file as having no matching control total information. In response to determining that matching control total information has been received for the at least one ACH data file, the processor can then remove the suspended status of the at least one ACH data file, as represented in block 308. As indicated at block 310, once it has been determined that matching control total information has been received for the at least one ACH data file, the processor can also release the at least one ACH data file for further processing at a subsequent scheduled ACH data file batch processing operation.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:

a mainframe computer having a first processor;

memory communicatively coupled to the first processor, the memory including instructions that are executable by the first processor to cause the first processor to:

identify, using a core processing application of an existing transaction processing system implemented on the mainframe computer, at least one ACH data file of a plurality of received ACH data files as having no matching control total information, and in response to the identifying of the at least one ACH data file, suspend, using the core processing application, processing of the at least one ACH data file, and assign a suspended status to the at least one ACH data file by directing the core processing application to write a processing suspension message to a suspend work file;

a control total reevaluation module communicatively coupled to the existing transaction processing system, the control total reevaluation module including a second processor configured to cause the control total reevaluation module to:

create an exception table within the core processing application of the existing transaction processing system, extract at least some information contained in the processing suspension message of the core processing application suspend work file and store the extracted information as a corresponding processing suspension message entry in the exception table, automatically detect the suspended status of the at least one ACH data file by reading the processing suspension message entry in the exception table, based on the detected suspended status of the at least one ACH data file, automatically compare, using at least some of the information stored in the exception table, the at least one ACH data file to new control total information received by the core processing application of the existing transaction processing system subsequent to identifying, by the core processing application, the at least one ACH data file as having no matching control total information, and resultantly determine that matching control total information has been received for the at least one ACH data file, in response to determining that matching control total information has been received for the at least one ACH data file, amend a collected file segment of the at least one ACH data file to remove the suspended status of the at least one ACH data file and release the at least one ACH data file for further processing, and cause the core processing application of the existing transaction processing system to further process the at least one ACH data file at a subsequent scheduled ACH data file batch processing operation.

2. The system of claim 1, wherein the memory of the mainframe computer includes instructions that are executable by the first processor to cause the core processing application to identify the at least one ACH data file as having no matching control total information prior to or at a first scheduled ACH data file batch processing operation.

3. The system of claim 1, wherein the core processing application includes an automated schedule and arrival processing (ASAP) component that is configured to match received ACH data files with received control total information.

4. The system of claim 1, wherein the second processor is configured to cause the control total reevaluation module to stop comparing the at least one ACH data file to new control total information received by the core processing application of the existing transaction processing system after some predetermined number of ACH data file batch processing operations have been completed by the existing transaction processing system or after a predetermined amount of time has passed.

5. The system of claim 4, wherein the second processor is configured to further cause the control total reevaluation module to purge all matching control total information received by the core processing application of the existing transaction processing system after the predetermined number of ACH data file batch processing operations have been completed or after the predetermined amount of time has passed.

6. The system of claim 1, wherein the second processor is configured to cause the control total reevaluation module to calculate and assign a new distribution and settlement date for at least one batch within the at least one ACH data file.

7. The system of claim 1, wherein the second processor is configured to cause the control total reevaluation module to ignore any ACH data files that have been suspended for a reason other than, or in addition to, a lack of matching control total information.

8. A non-transitory computer-readable medium comprising instructions that are executable by a processor of a control total reevaluation module for causing the control total reevaluation module to:

communicate with a mainframe computer configured to:

identify, using a core processing application of an existing transaction processing system implemented on the mainframe computing system, at least one ACH data file of a plurality of received ACH data files as having no matching control total information, and in response to the identifying of the at least one ACH data file, suspend, using the core processing application, processing of the at least one ACH data file, and assign a suspended status to the at least one ACH data file by directing the core processing application to write a processing suspension message to a suspend work file;

create an exception table within the core processing application of the existing transaction processing system;

extract at least some information contained in the processing suspension message of the core processing application suspend work file and store the extracted information as a corresponding processing suspension message entry in the exception table;

automatically detect the suspended status of the at least one ACH data file by reading the processing suspension message entry in the exception table;

based on the suspended status of the at least one ACH data file, automatically compare, using at least some of the information stored in the exception table, the at least one ACH data file to new control total information received by the core processing application of the existing transaction processing system subsequent to identifying, by the core processing application, the at least one ACH data file as having no matching control total information, and resultantly determine that matching control total information has been received for the at least one ACH data file;

in response to determining that matching control total information has been received for the at least one ACH data file, amend a collected file segment of the at least one ACH data file to remove the suspended status of the at least one ACH data file and release the at least one ACH data file for further processing; and cause the core processing application of the existing transaction processing system to further process the at least one ACH data file at a subsequent scheduled ACH data file batch processing operation.

9. The non-transitory computer-readable medium of claim 8, wherein the core processing application is configured to identify the at least one ACH data file as having no matching control total information prior to or at a first scheduled ACH data file batch processing operation.

10. The non-transitory computer-readable medium of claim 8, wherein the core processing application includes an automated schedule and arrival processing (ASAP) component that is configured to match received ACH data files with received control total information.

11. The non-transitory computer-readable medium of claim 8, further comprising instructions that are executable by the processor for causing the control total reevaluation module to stop comparing the at least one ACH data file to new control total information received by the core processing application of the existing transaction processing system after some predetermined number of ACH data file batch processing operations have been completed by the existing transaction processing system or after a predetermined amount of time has passed.

12. The non-transitory computer-readable medium of claim 11, further comprising instructions that are executable by the processor for further causing the control total reevaluation module to purge all matching control total information received by the core processing application of the existing transaction processing system after the predetermined number of ACH data file batch processing operations have been completed or after the predetermined amount of time has passed.

13. The non-transitory computer-readable medium of claim 8, further comprising instructions that are executable by the processor for causing the control total reevaluation module to calculate and assign a new distribution and settlement date for at least one batch within the at least one ACH data file.

14. The non-transitory computer-readable medium of claim 8, further comprising instructions that are executable by the processor for causing the control total reevaluation module to ignore any ACH data files that have been suspended for a reason other than, or in addition to, a lack of matching control total information.

15. A computer-implemented method comprising:

identifying, by a first processor of a mainframe computing system, using a core processing application of an existing transaction processing system implemented on the mainframe computing system, at least one ACH data file of a plurality of received ACH data files as having no matching control total information;

in response to the identifying of the at least one ACH data file, suspending, by the core processing application, processing of the at least one ACH data file and assigning, by the core processing application, a suspended status to the at least one ACH data file by writing a processing suspension message to a suspend work file;

communicatively coupling a control total reevaluation module to the existing transaction processing system, the control total reevaluation module including a second processor;

creating, by the second processor of the control total reevaluation module, an exception table within the core processing application of the existing transaction processing system, extracting, by the second processor of the control total reevaluation module, at least some information contained in the processing suspension message of the core processing application suspend work file and storing the extracted information as a corresponding processing suspension message entry in the exception table;

automatically detecting, by the second processor of the control total reevaluation module, the suspended status of the at least one ACH data file by reading the processing suspension message entry in the exception table;

based on the suspended status of the at least one ACH data file, automatically comparing, by the second processor of the control total reevaluation module using at least some of the information stored in the exception table, the at least one ACH data file to new control total information received by the core processing application of the existing transaction processing system subsequent to identifying, by the core processing application, the at least one ACH data file as having no matching control total information, and resultantly determining, by the second processor of the control total reevaluation module, that matching control total information has been received for the at least one ACH data file;

in response to determining that matching control total information has been received for the at least one ACH data file, amending, by the second processor of the control total reevaluation module, a collected file segment of the at least one ACH data file to remove the suspended status of the at least one ACH data file and to release the at least one ACH data file for further processing; and causing, by the second processor of the control total reevaluation module, the core processing application of the existing transaction processing system to further process the at least one ACH data file at a subsequent scheduled ACH data file batch processing operation.

16. The computer-implemented method of claim 15, wherein the at least one ACH data file is identified by the core processing application of the existing transaction processing system as having no matching control total information prior to or at a first scheduled ACH data file batch processing operation.

17. The computer-implemented method of claim 15, wherein the received ACH data files are matched with received control total information by an automated schedule and arrival processing (ASAP) component of the core processing application.

18. The computer-implemented method of claim 15, further comprising:

ignoring, by the second processor of the control total reevaluation module, ACH data files that have been suspended for a reason other than, or in addition to, a lack of matching control total information; and terminating, by the second processor of the control total reevaluation module, comparing of the at least one ACH data file to new control total information received by the core processing application of the existing transaction processing system after some predetermined number of ACH data file batch processing operations have been completed by the existing transaction processing system or after a predetermined amount of time has passed.

19. The computer-implemented method of claim 15, further comprising purging, by the second processor of the control total reevaluation module all matching control total information received by the core processing application of the existing transaction processing system after a predetermined number of ACH data file batch processing operations have been completed by the existing transaction processing system or after a predetermined amount of time has passed.

20. The computer-implemented method of claim 15, further comprising calculating and assigning, by the second processor of the control total reevaluation module, a new distribution and settlement date for at least one batch within the at least one ACH data file.

\* \* \* \* \*